(12) United States Patent
Yamanaka

(10) Patent No.: US 7,940,193 B2
(45) Date of Patent: May 10, 2011

(54) PARKING ASSIST APPARATUS

(75) Inventor: Takashi Yamanaka, Chita (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 262 days.

(21) Appl. No.: 11/966,148

(22) Filed: Dec. 28, 2007

(65) Prior Publication Data
US 2008/0158011 A1 Jul. 3, 2008

(30) Foreign Application Priority Data

Dec. 28, 2006 (JP) ................................ 2006-354572

(51) Int. Cl.
B60Q 1/48 (2006.01)
(52) U.S. Cl. ..................................... 340/932.2; 340/436
(58) Field of Classification Search ................ 340/932.2
See application file for complete search history.

(56) References Cited

U.S. PATENT DOCUMENTS

| | | | |
|---|---|---|---|
| 6,487,481 B2* | 11/2002 | Tanaka et al. ..................... 701/41 |
| 6,564,130 B2* | 5/2003 | Shimazaki et al. ................ 701/41 |
| 6,587,760 B2* | 7/2003 | Okamoto ............................ 701/1 |
| 6,611,744 B1* | 8/2003 | Shimazaki et al. ................ 701/41 |
| 6,654,670 B2* | 11/2003 | Kakinami et al. .................. 701/1 |
| 6,778,891 B2* | 8/2004 | Tanaka et al. ..................... 701/41 |
| 6,825,880 B2* | 11/2004 | Asahi et al. ................ 348/333.02 |
| 6,999,003 B2* | 2/2006 | Matsukawa et al. ......... 340/932.2 |
| 7,006,127 B2* | 2/2006 | Mizusawa et al. ............. 348/118 |
| 7,012,549 B2* | 3/2006 | Mizusawa et al. .......... 340/932.2 |
| 7,039,504 B2* | 5/2006 | Tanaka et al. ...................... 701/1 |
| 7,069,128 B2* | 6/2006 | Iwama ............................. 701/36 |
| 7,257,486 B2* | 8/2007 | Shimazaki et al. ............ 701/300 |
| 7,295,227 B1* | 11/2007 | Asahi et al. .................... 348/118 |
| 7,363,130 B2* | 4/2008 | Sakakibara ...................... 701/36 |
| 7,375,651 B2* | 5/2008 | Shimazaki et al. .......... 340/932.2 |
| 7,379,089 B2* | 5/2008 | Takagi et al. .................. 348/148 |
| 7,379,564 B2* | 5/2008 | Kakinami et al. ............. 382/104 |
| 7,554,573 B2* | 6/2009 | Mizusawa ...................... 348/115 |
| 7,706,943 B2* | 4/2010 | Shimazaki ....................... 701/41 |
| 7,755,511 B2* | 7/2010 | Yamamoto et al. ......... 340/932.2 |
| 2002/0191078 A1* | 12/2002 | Okamoto et al. .............. 348/148 |
| 2004/0153243 A1* | 8/2004 | Shimazaki et al. ............ 701/300 |
| 2006/0080005 A1* | 4/2006 | Lee et al. .......................... 701/1 |
| 2006/0190147 A1* | 8/2006 | Lee et al. ......................... 701/26 |
| 2006/0287800 A1* | 12/2006 | Watanabe et al. ............... 701/96 |
| 2007/0239357 A1* | 10/2007 | Mori et al. ..................... 701/213 |

FOREIGN PATENT DOCUMENTS

JP 2001-334898 A 12/2001

* cited by examiner

Primary Examiner — Daniel Wu
Assistant Examiner — Brian Wilson
(74) Attorney, Agent, or Firm — Sughrue Mion, PLLC

(57) ABSTRACT

A parking assist apparatus assisting a parking operation of a vehicle includes an image capturing portion capturing an image of a backward view of the vehicle, a displaying portion displaying the captured image at an inside of the vehicle, a guiding portion guiding the vehicle to a target parking space when the vehicle reverses with a turning movement based on a predetermined steering angle held by an operator of the vehicle, and a superimposing portion superimposing a first assist line arranged in the target parking space to be in parallel to a front-rear direction of the target parking space and a second assist line extending to a backward area of the vehicle to be in parallel to a front-rear direction of the vehicle on the captured image. The first and second assist lines are possibly overlapped each other when a vehicle reverse movement with the turning movement is completed.

5 Claims, 8 Drawing Sheets

PARKING ASSIST APPARATUS

CROSS REFERENCE TO RELATED APPLICATIONS

This application is based on and claims priority under 35 U.S.C. §119 to Japanese Patent Application 2006-354572, filed on Dec. 28, 2006, the entire content of which is incorporated herein by reference.

FIELD OF THE INVENTION

The present invention generally relates to a parking assist apparatus assisting a parking operation of a vehicle.

BACKGROUND

A parking assist apparatus, which can reduce an operational burden on a driver of a vehicle when parking the vehicle, is disclosed in JP2001-334898A (hereinafter, referred to as reference 1) and specifically in paragraphs 24 to 35, FIGS. 6 to 8, for example. According to the parking assist apparatus disclosed in the reference 1, a backward view of the vehicle is captured by a camera and displayed on a monitor screen provided inside a compartment of the vehicle. A guidance mark for parking the vehicle at a parking frame is displayed on the monitor screen.

A parking assist by the parking assist apparatus disclosed in the reference 1 is executed in accordance with a procedure as described herein. The driver stops the vehicle so that a front-rear direction of the vehicle is orientated substantially perpendicularly to a front-rear direction of a predetermined parking frame, to which the driver aims at parking the vehicle in a back-in parking manner. A stop position, at which the driver stops the vehicle, is a slightly forward position from a position where the driver can park the vehicle to the predetermined parking frame as a steering wheel is steered to a maximum steering angle. When a parking assist function is activated at the stop position, a parking stall, in which the vehicle can be parked in a case where the vehicle is reversed as the steering wheel is steered to the maximum angle, is superimposed and displayed on the monitor screen. The driver reverses the vehicle until the predetermined parking frame and the parking stall are matched and then stops the vehicle. A rear-end expected locus of the vehicle in accordance with an operation amount of a steering wheel is displayed on the monitor screen. The driver of the vehicle steers the steering wheel to an approximately maximum steering angle at the stop position of the vehicle. The rear-end expected locus of the vehicle extends towards the predetermined parking frame and nearly matches the predetermined parking frame on the monitor screen. The driver reverses the vehicle maintaining the steering angle of the steering wheel in accordance with an acoustic guidance. A vehicle width extended lines are superimposed and displayed on the monitor screen. Then, the driver reverses the vehicle maintaining the steering angle of the steering wheel until the vehicle width extended lines are orientated to be in parallel with the predetermined parking frame. When the vehicle width extended lines and the predetermined parking frame are arranged to be in parallel, the driver returns the steering wheel to a neutral position from the approximately maximum steering angle and reverses the vehicle in a straight manner so that the vehicle is parked within the predetermined parking frame.

The parking assist apparatus disclosed in the reference 1 has such a superior characteristic that a burden of a steering operation of the driver when parking the vehicle can be reduced. However, when the vehicle is orientated to be almost in parallel with the predetermined parking frame, the rear-end expected locus deviates from the predetermined parking frame. In a case where another vehicle is parked outside of the predetermined parking frame, the rear-end expected locus is superimposed and displayed on the parked vehicle on the monitor screen. The rear-end expected locus is an expected line of a condition where a current steering angle of the steering wheel is maintained. Accordingly, the driver's vehicle and the parked vehicle may not make contact one another directly. However, the driver may consider a possibility that his/her vehicle may make contact with the parked vehicle and therefore may returns the steering wheel from a steering angle to be maintained. Then, there is a possibility that the vehicle may not be parked within the parking frame and/or the vehicle is parked in an angled manner. It is preferable for the vehicle using the parking assist apparatus not to be parked in such an undesired manner.

A need thus exists for a parking assist apparatus which is not susceptible to the drawback mentioned above.

SUMMARY OF THE INVENTION

According to an aspect of the present invention, a parking assist apparatus assisting a parking operation of a vehicle includes an image capturing portion, a displaying portion, a guiding portion and a superimposing portion. The image capturing portion captures an image of a backward view of the vehicle. The displaying portion displays the image captured by the image capturing portion at an inside of the vehicle. The guiding portion guides the vehicle to a target parking space when the vehicle reverses with at least a turning movement based on a predetermined steering angle held by an operator of the vehicle. The superimposing portion superimposes a first assist line and a second assist line on the image captured by the image capturing portion. The first assist line is arranged in the target parking space to be in parallel to a front-rear direction of the target parking space and a second assist line extends to a backward area of the vehicle to be in parallel to a front-rear direction of the vehicle. Both of the first assist line and the second assist line are possibly overlapped each other when a vehicle reverse movement with the turning movement is completed.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
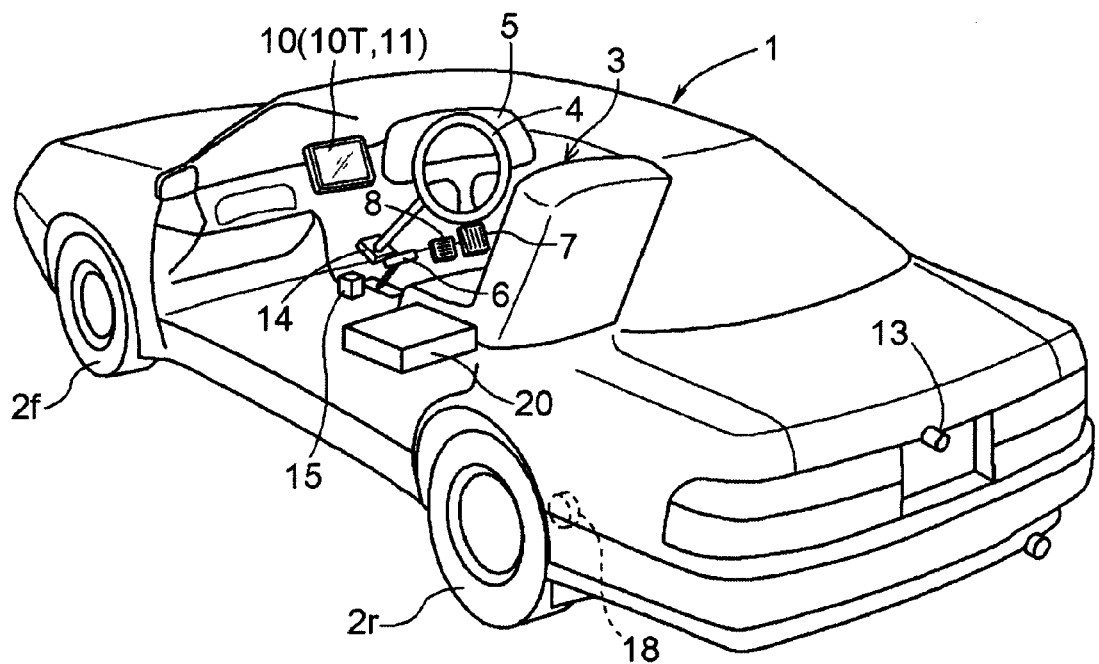
FIG. 1 is a partially cut out perspective view of a vehicle illustrating an operator seat.
Figure 2:
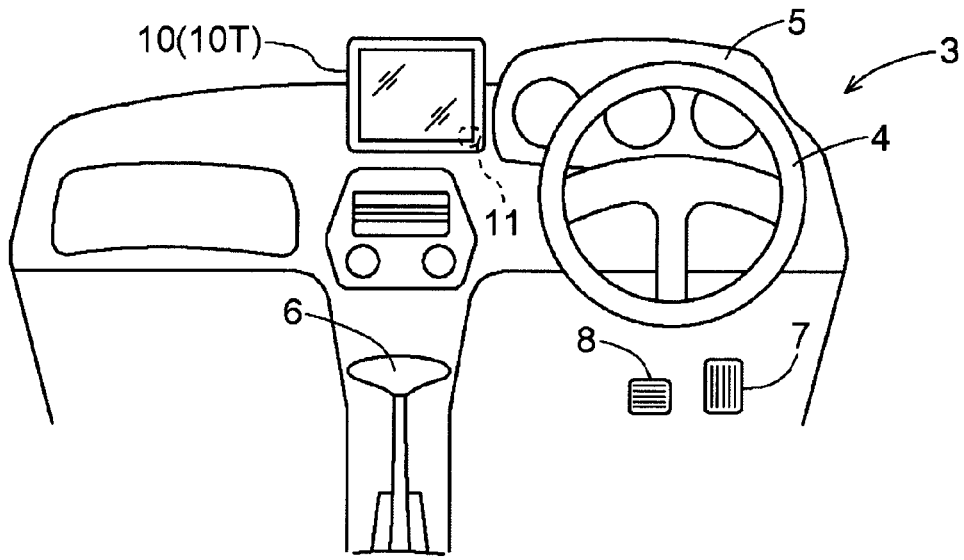
FIG. 2 is an explanatory view illustrating a front portion of the operator seat.
Figure 3:
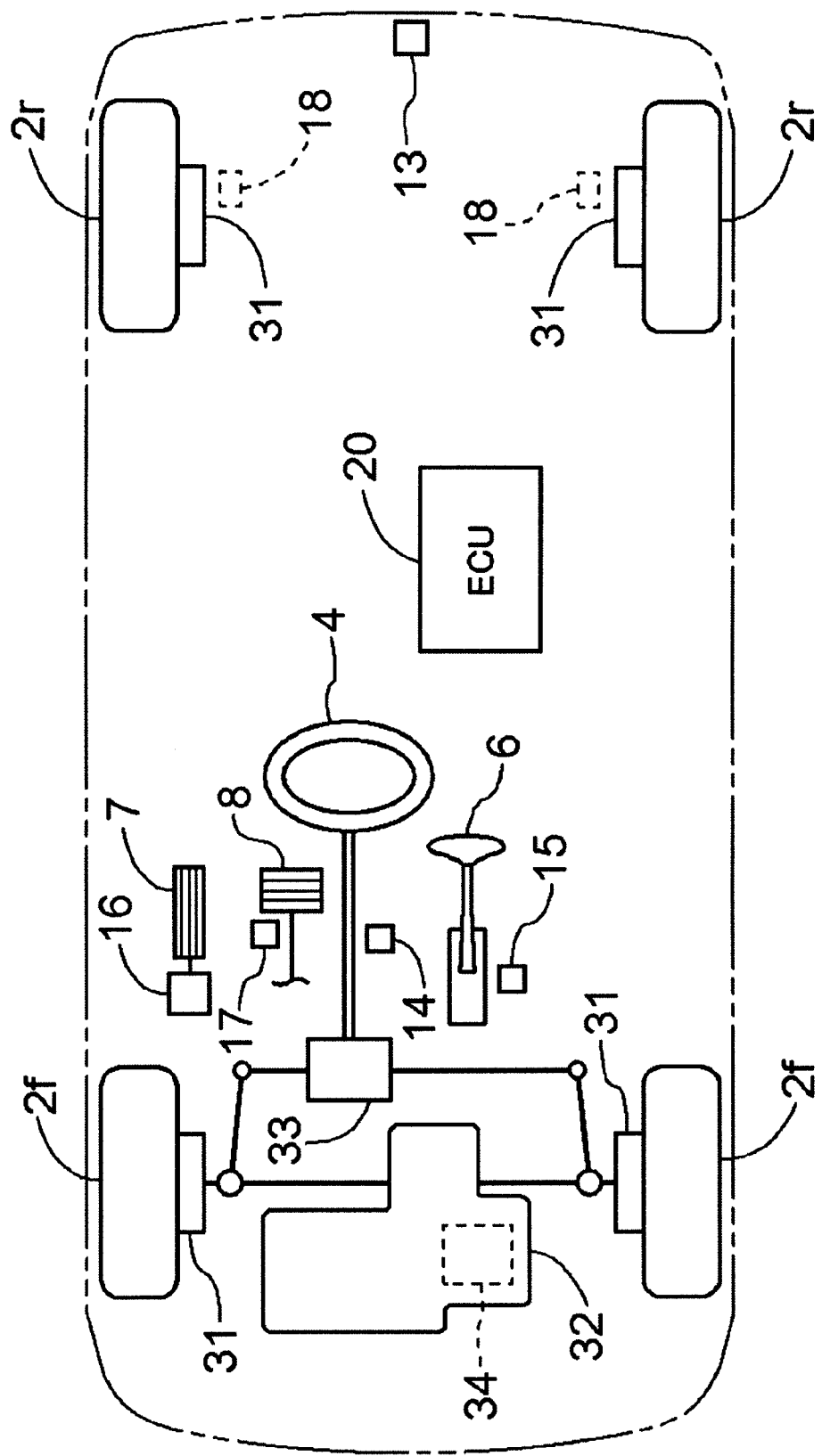
FIG. 3 is a plan view schematically illustrating a structure of each components of the vehicle.

An embodiment of a parking assist apparatus according to the present invention will be described hereinafter with reference to the attached drawings. Each of FIGS. 1 to 3 illustrates a general configuration of a vehicle 1. A steering wheel 4 provided at an operator seat 3 is interlocked with a power steering unit 33 for executing a drive-steering operation by transmitting a rotation operational force to front wheels 2f. An engine 32 and a transmission mechanism 34 are provided at a front portion of a vehicle body of the vehicle 1. The transmission mechanism 34 includes a torque converter, a CVT (continuously variable transmission) mechanism, or the like, for changing a power output of the engine 32 and transmitting the power output to the front wheels 2f by adjusting a rotational speed of components in the transmission mechanism 34. An accelerator pedal 7 and a brake pedal 8 are provided at a vicinity of the operator seat 3 to be in parallel one another. The accelerator pedal 7 serves as an accelerator operating portion for controlling driving speed of the vehicle 1. The brake pedal 8 operates brake devices 31 respectively provided at the front wheels 2f and rear wheels 2r so that braking force is applied to the front wheels 2f and the rear wheels 2r.

A monitor 10 (serving as a displaying portion) is provided at an upper portion of a console arranged at the vicinity of the operator seat 3. The monitor 10 is formed with a touch panel 10T on its display surface and is provided with a speaker 11. The speaker 11 may be provided at a panel 5 or at an inner side of a vehicle door. A rear camera 13 (serving as an image capturing portion) is provided at a rear end of the vehicle 1. The monitor 10 is a liquid crystal type monitor having a backlight. Alternatively, the monitor 10 may be a plasma display type monitor or a CRT (cathode-ray tube) type monitor. In addition, pressure sensing type touch panel or an electrostatic type touch panel are employed as the touch panel 10T of the monitor 10, and the touch panel 10T outputs a position, on which a user touches by using his/her finger for example, as a location data. Additionally, a displaying device of a navigation system may be commonly used as the monitor 10 of the parking assist apparatus.

The rear camera 13 is a digital camera housing image sensors such as a CCD (charge coupled device) and a CIS (CMOS image sensor) and outputting captured image information in real time as a motion image information. The rear camera 13 is equipped with a wide angle lens, of which each right and left perspective is 140 degrees, for example. The rear camera 13 is arranged at the rear portion of the vehicle 1 to be angled by 30 degrees towards a lower side of the vehicle 1 and captures a view of a rear area from the vehicle 1 up to approximately 8 meters.

A steering sensor 14 is provided as an operation system of the steering wheel 4, and a direction of a steering operation and an amount thereof are measured. A shift position sensor 15 is provided as an operation system of a shift lever 6, and a shift position is identified. An accelerator sensor 16 is provided as an operation system of the accelerator pedal 7, and an operation amount of the accelerator pedal 7 is measured. A brake sensor 17 is provided as an operation system of the brake pedal 8 and detects a presence, or an absence, of an operation of the brake pedal 8.

In addition, rotation sensors 18 are provided as a moving distance sensor and detects a rotational amount of at least one of a pair of front wheels 2f and a pair of rear wheels 2r. Alternatively, a moving distance of the vehicle 1 may be measured from a rotational amount of a driving system at the transmission mechanism 34. Further, the vehicle 1 is provided with an ECU (electronic control unit) 20 which executes a driving control including a parking assist.

Figure 4:
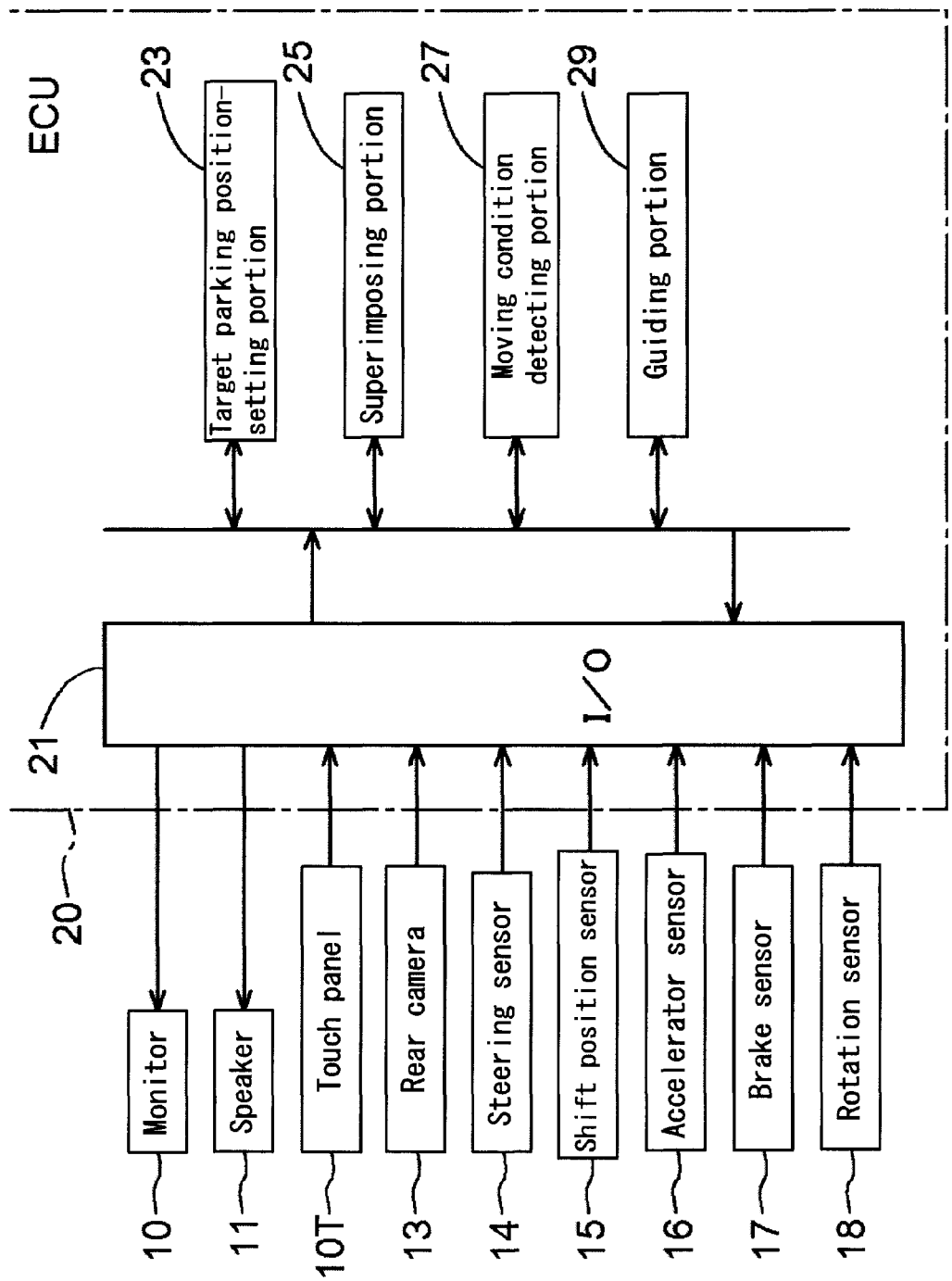
FIG. 4 is a block diagram schematically illustrating a structure of a parking assist apparatus according to the embodiment.

FIG. 4 is a block diagram schematically illustrating a configuration of the parking assist apparatus according to the embodiment of the present invention. The parking assist apparatus is structured arranging the ECU 20 as a main function The ECU 20 includes an input-output interface 21 (hereinafter, referred to as I/O interface 21) for inputting and outputting information, and a microprocessor for processing the information from the I/O interface 21. Alternatively, the I/O interface 21 may be partially or entirely included in the microprocessor. The ECU 20 is structured by an electric circuit in which the microprocessor serves as a min functional member.

The I/O interface 21 is inputted with information from the touch panel 10T, the rear camera 13, the steering sensor 14, the shift position sensor 15, the accelerator sensor 16, the brake sensor 17, the rotation sensor 18, and so on, so that input systems are structured between the I/O interface 21 and the respective components. Further, the I/O interface 21 outputs control signals to the monitor 10 and the speaker 11, so that the output systems are structured between the I/O interface 21 and the respective components. Additionally, the rear camera 13 corresponds to the image capturing portion capturing an image of a backward view of the vehicle 1. The monitor 10 corresponds to the display portion displaying the image captured by the rear camera 13 (the image capturing portion) at an inside of the vehicle 1.

The ECU 20 includes functional portions respectively connected to the I/O interface 21. The I/O interface 21 and the functional portions are connected, for example, via a data bus, an address bus, a control bus, and a memory, all which are included in the microprocessor. A detailed description and illustration of such members for a connection of the I/O interface 21 and the functional portions are omitted herein so as to simplify the description. As best shown in FIG. 4, the ECU 20 includes a target parking position-setting portion 23, a superimposing portion 25, a moving condition detecting potion 27, and a guiding portion 29, respectively serving as the functional portions. The embodiment of the present invention illustrates a case where such functional portions are established by cooperation of the microprocessor and program of the ECU 20. In other words, these portions function independently from each other but are not necessarily separated from each other physically. Additionally, the functional portions may be structured by hardware with a logical circuit or the like.

Figure 5:
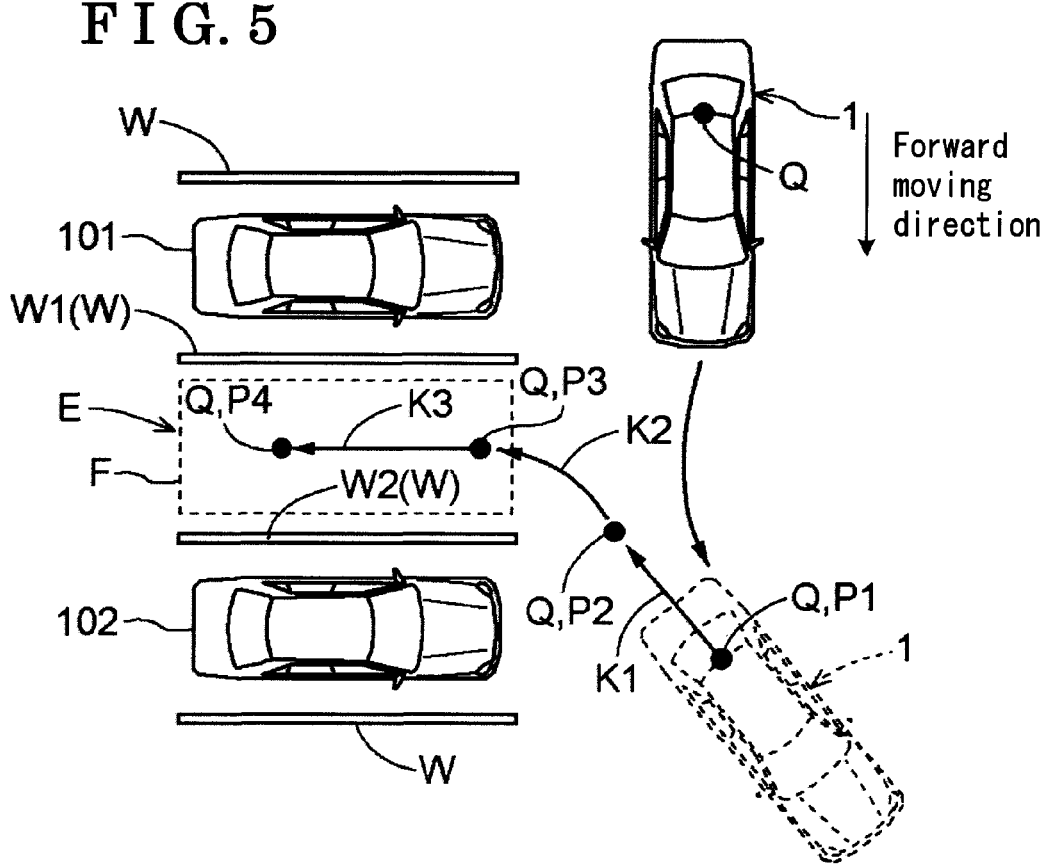
FIG. 5 is an explanatory view illustrating a course for guiding the vehicle to a parking frame.

FIG. 5 is an explanatory view illustrating a course for guiding the vehicle 1 to a parking frame. A point Q is a reference point to be referred when the guiding portion 29 guides the vehicle 1. According to the embodiment, the vehicle 1 is supposed to be parked within a parking frame E divided by parking frame lines W lined at a right side of a forward moving direction of the vehicle 1. As shown in FIG. 5, the vehicle 1 is operated to be parked in the parking frame E divided by parking frame lines W1 and W2. Other vehicles 101 and 102 are already parked at both sides (upper and lower sides in FIG. 5) of the parking frame E, respectively. A target parking space F is set within the parking frame E. Firstly, an operator assisted by the parking assist apparatus drives the vehicle 1 in the forward moving direction passing through a front side area of the parking frame E (i.e., a right side area of the parking frame E in FIG. 5), and turns the vehicle 1 towards a left direction relative to the forward moving direction. Then, the operator directs the rear portion of the vehicle 1 towards the parking frame E including the target parking space F and stops the vehicle. At this time, the reference point Q of the vehicle 1 is located at a vehicle position P1 as shown in FIG. 5.

The guiding portion 29 guides the vehicle 1 to the target parking space F when the vehicle 1 reverses with at least a turning movement based on a predetermined steering angle held by the operator of the vehicle 1. More specifically, the operator reverses the vehicle 1 in a straight manner in accordance with a guidance of the guiding portion 29 until the reference point Q reaches a vehicle position P2 from the vehicle position P1, as indicated with an arrow K1 (course K1). Accordingly, the vehicle position P1 serves as a guidance starting position Next, the operator holds the steering wheel 4 at the predetermined steering angle and further reverses the vehicle 1 with the turning movement until the reference point Q reaches a vehicle position P3 from the vehicle position P2, as indicated with an arrow K2 (course K2). Accordingly, the vehicle position P2 serves as a turning-movement starting position (serving as a position to start the turning movement) and the vehicle position P3 serves as a turning-movement completed position (serving as a position to complete the turning movement). Then, the operator returns the steering wheel 4 to a neutral position and reverses the vehicle 1 in a straight manner until the reference point Q reaches a vehicle position P4 from the vehicle position P3, as indicated with an arrow K3 (course K3). The vehicle position P4 serves as a target parking position set on the basis of the target parking space F. When the reference point Q of the vehicle 1 reaches the vehicle position P4, the vehicle 1 is accommodated and parked within the parking frame B including the target parking space F.

Figure 6:
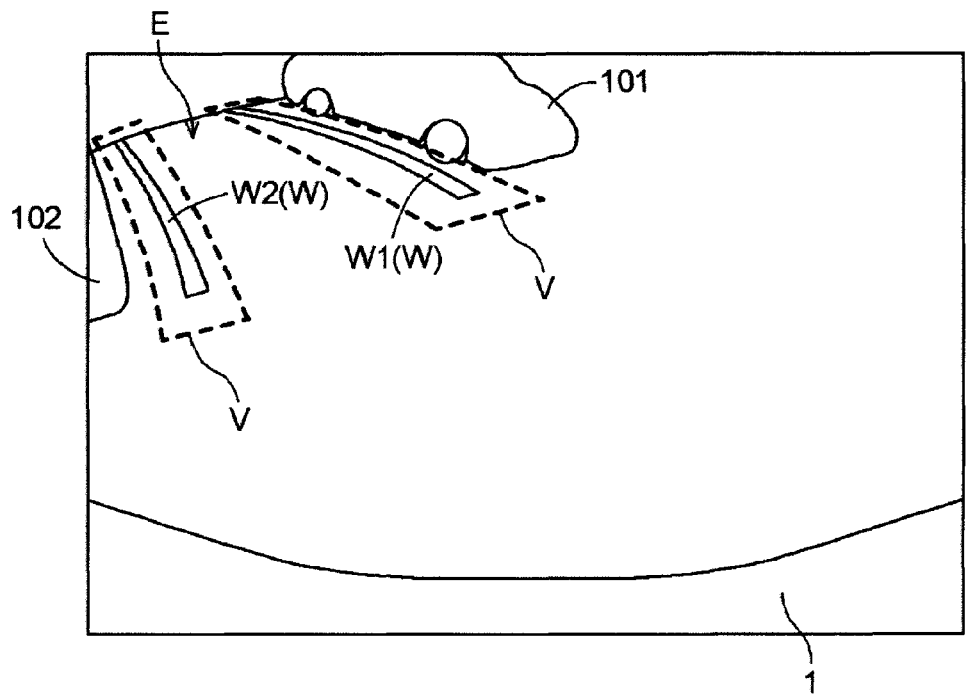
FIG. 6 is an explanatory view illustrating a method for setting a target parking space from an image captured by a rear camera of the vehicle.

FIG. 6 is an explanatory view illustrating a method for setting the target parking space F by recognizing the parking frame E from the image captured by the rear camera 13 at the guidance starting position P1. As described above, the rear camera 13 is provided at the rear portion of the vehicle 1 to be angled towards the lower side of the vehicle 1. Accordingly, a rear bumper of the vehicle 1 is also displayed on the captured image as well as a back road surface (ground) of the vehicle 1. Further as described above, the vehicle 1 is stopped at the guidance parking position P1 directing the rear portion of the vehicle 1 to the parking frame E. Accordingly, a view including the parking frame E is captured by the rear camera 13. The target parking position-setting portion 23 recognizes the parking frame E by recognizing the parking frame lines W1 and W2 as the image and sets the target parking space F.

A size of the space of the parking frame E is determined within a certain range. Further, the guidance starting position P1 for stopping the vehicle 1 is accommodated within a substantially regular range even though the position slightly differs depending on operators of the vehicle. Accordingly, as illustrated in FIG. 6, areas, in which the parking frame lines W are supposed to be located, are assigned as remarked areas V and a recognizing process is performed. In such a parking stall, the ground is generally colored in a dark color because of asphalt pavement or the like, and the parking frame lines W are generally colored in a light color such as white or yellow. Accordingly, the parking frame lines W are properly recognized with a known image processing technique such as edge detection and Hough transform.

The parking frame E is recognized on the basis of the recognized parking frame lines W (W1 and W2) and the target parking space F is set. After the target parking space F is set, the parking position setting portion 23 sets coordinates of the vehicle position P4 as the target parking position. The coordinates of the vehicle position P4 is derived on the basis of a known image processing method for deriving three dimensional coordinates from a two dimensional image. The target parking position P4 is set on assumption that the parking stall is arranged on a horizontal surface without any slope. Additionally, in such a condition, the target parking space F and the parking frame E may be superimposed and displayed on the captured image as well as displaying the captured image on the monitor 10. Superimposition for a superimpose display is generated by the superimposing portion 25. Further, positions of the target parking space F and the parking frame E may be finely adjusted by a manual operation of the operator by using the touch panel 10T.

When the target parking position P4 is set, the guiding portion 29 calculates a course for guiding the vehicle 1 to the parking frame E on the basis of the target parking position P4 and the guidance starting position P1 where the vehicle 1 is located at that current time. More specifically, as best shown in FIG. 5, the courses K1 and K3, along which the vehicle 1 reverses in a straight manner, and the course K2, along which the vehicle 1 is reversed with the turning movement, are calculated. In addition, coordinates of each of the vehicle position P2 (turning movement starting position) and the vehicle position P3 (turning movement completed position), both which respectively serve as connection points of the courses, are calculated. Here, the course K2 with the turning movement is calculated based on a condition where the steering angle of the steering wheel 4 is set to be maximum angle.

Figure 7:
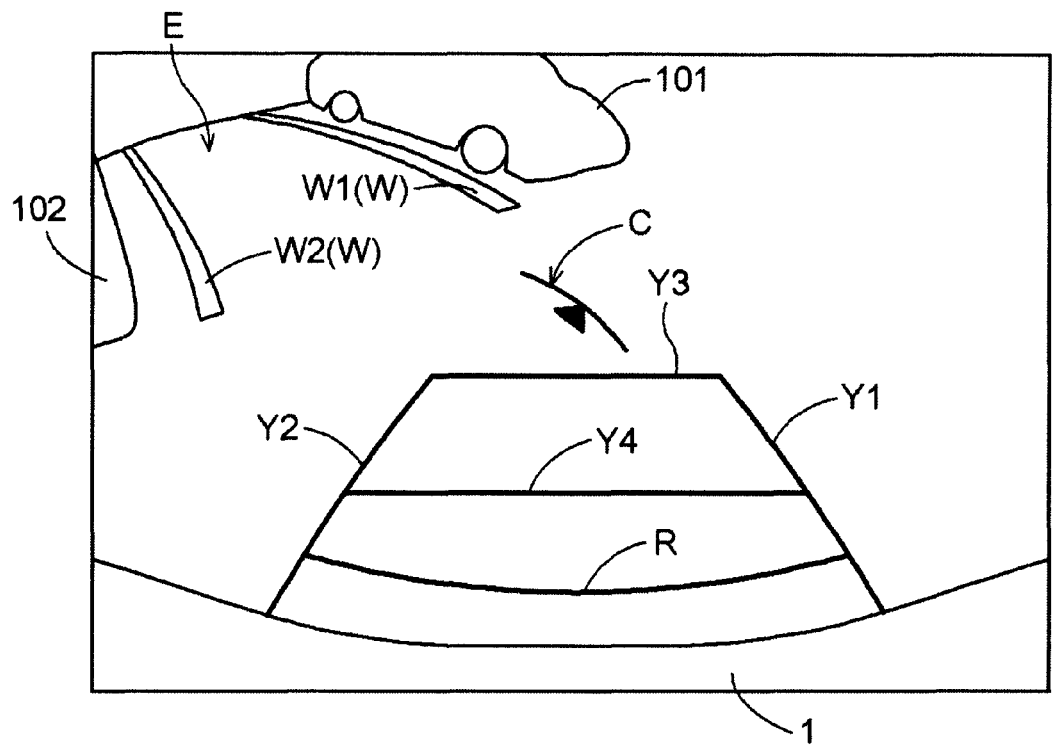
FIG. 7 is an explanatory view illustrating an example of a monitor screen when the vehicle is located at a guidance starting position.

FIG. 7 is an explanatory view illustrating an example of a screen of the monitor 10 when the vehicle 1 (reference point Q) is located at the guidance starting position P1. After the target parking position P4 is set, parking guides are superimposed and displayed on the captured image on the monitor 10 by the guiding portion 29 and the superimposing portion 25. For example, parking guides indicated with reference codes Y1, Y2, Y3 and Y4 are colored in yellow. Further, a parking guide indicated with a reference code R is colored in red and a parking guide indicated with a reference code C is colored in blue. Here, the reference code Y1 is a left-rear end expected locus line and the reference code Y2 is a right-rear end expected locus line. The reference code Y3 is an expected line of 3 meters backward from the vehicle 1 (hereinafter, referred to as 3 meters backward expected line Y3) and the reference Y4 is an estimated line of 1 meter backward from the vehicle 1 (hereinafter, referred to as 1 meter backward estimated line Y4). The reference code R is a warning line of 50 centimeters backward from the vehicle 1 (hereinafter, referred to as 50 centimeters backward warning line R) and the reference code C is a mark making a contact with the parking frame E including the target parking space F and thereby indicating the turning movement starting position P2, i.e., a position to stop reversing in the straight manner. Hereinafter, the mark C is referred to as a turning movement starting position mark C.

The guiding portion 29 superimposes and displays the parking guides illustrated in FIG. 7 on the monitor 10 via the superimposing portion 25 and further, acoustically informs the operator of the vehicle 1 about a driving operation via the speaker 11. In other words, the guiding portion 29 outputs a massage informing the operator to reverse the vehicle 1 in a straight manner with the steering wheel 4 maintained at the neutral position until the turning movement starting position mark C makes a contact with the parking frame line W1. The operator of the vehicle 1 sets the shift lever 6 into a reverse position and maintains the steering wheel 4 at the neutral position. Then, the operator releases the brake pedal 8 and reverses the vehicle 1 in a straight manner, for example by a creeping motion, in which a vehicle (with an automatic transmission, for example) moves without pressing on an accelerator pedal.

A condition of the steering wheel 4, during the vehicle 1 reverses, is detected by the steering sensor 14, and the moving distance of the vehicle 1 is detected by the rotation sensor 18. On the basis of results respectively detected by such sensors, the moving condition detecting portion 27 detects a moving condition of the vehicle 1. The guiding portion 29 calculates coordinates of the reference point Q of the vehicle 1 moving from the guidance starting position P1 on the basis of a result detected by the moving condition detecting portion 27. Then, the guiding portion 29 calculates a display position of each of the parking guides so as to correspond to the reference point Q, and displays the parking guides on the monitor 10 via the superimposing portion 25.

Figure 8:
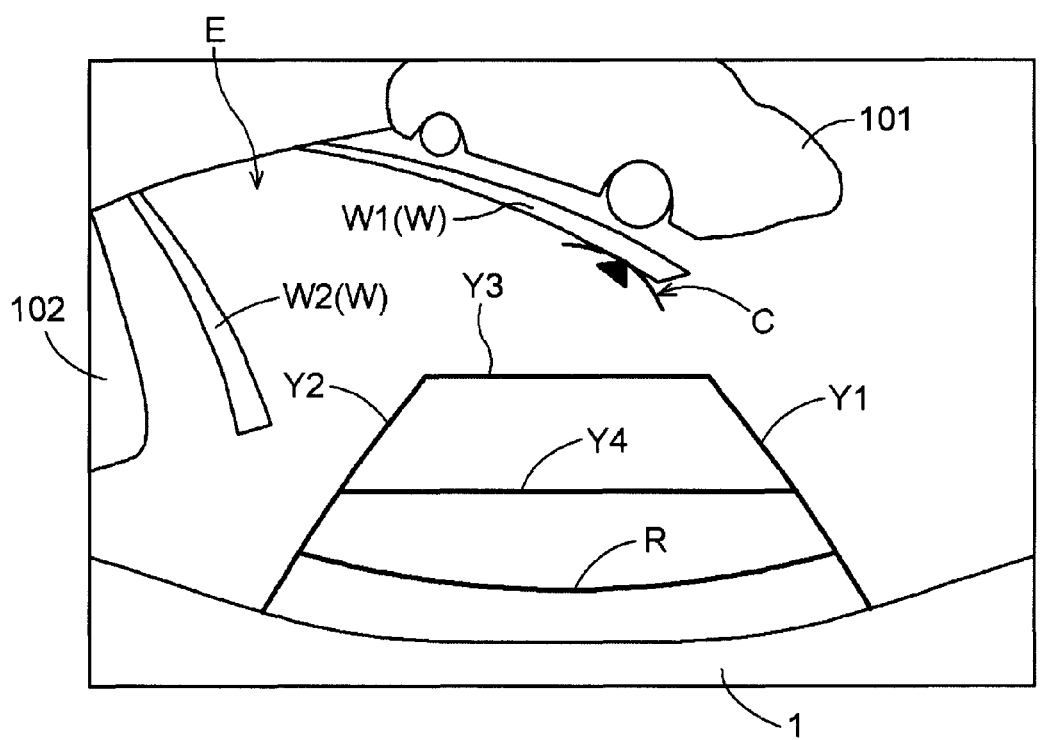
FIG. 8 is an explanatory view illustrating an example of the monitor screen when the vehicle is located at a turning movement starting position.

FIG. 8 is an explanatory view illustrating an example of the screen of the monitor 10 when the vehicle 1 (reference point Q) is located at the turning movement starting position P2. The superimposing portion 25 superimposes the turning movement starting position mark C on the monitor 10 so as to make a contact with the parking frame line W1 (the parking frame E including the target parking space F) when the vehicle 1 reaches the parking position P2. Accordingly, when the operator stops the vehicle 1 by operating the brake pedal 8 at a time when the turning movement starting position mark C makes a contact with the parking frame line W1 as illustrated in FIG. 8, the vehicle 1 is stopped substantially at the turning movement starting position P2.

Figure 9:
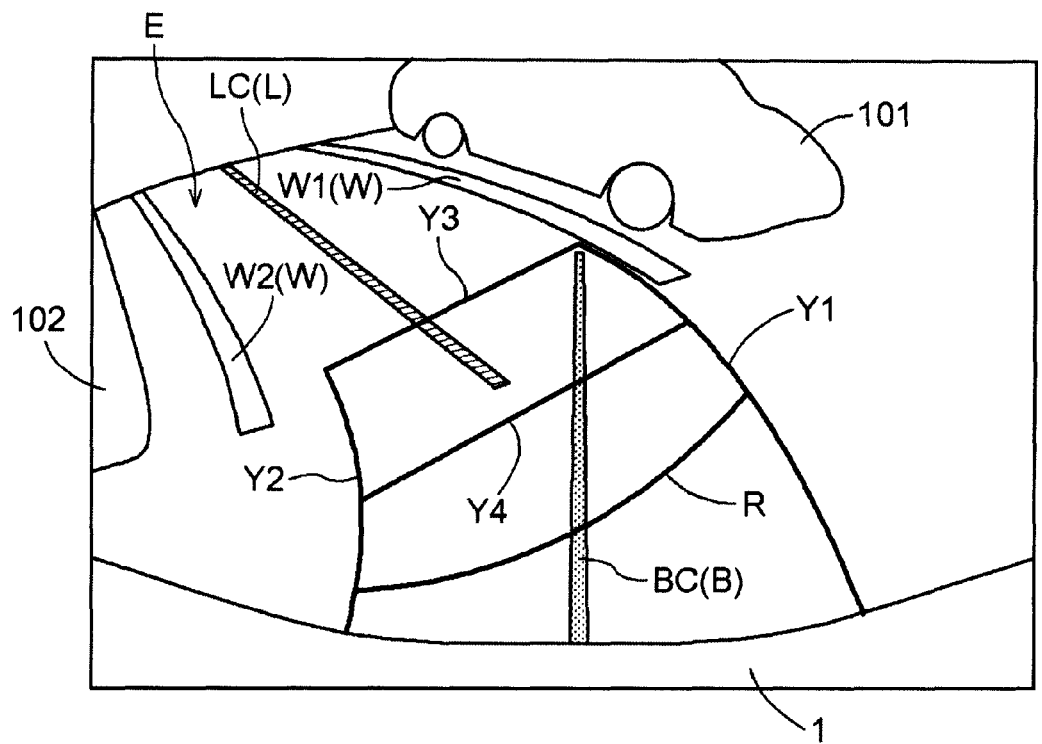
FIG. 9 is an explanatory view illustrating an example of the monitor screen when the vehicle is located at the turning movement starting position according to the embodiment.

FIG. 9 is an explanatory view illustrating an example of the screen of the monitor 10 when the vehicle 1 (reference point Q) is located at the turning movement starting position P2. When the vehicle 1 is stopped after arriving at the turning movement starting position P2, the guiding portion 29 acoustically informs the operator of the vehicle 1 to operate the steering wheel 4. According to the embodiment, the guiding portion 29 outputs a guidance massage for advising the operator to operate the steering wheel 4 until the steering wheel 4 reaches a maximum steering angle in the right direction as the vehicle 1 is stopped. The turning movement starting position mark C is deleted and alternatively, the superimposing portion 25 newly superimposes two parking guides, which is a target parking line L (serving as a first assist line) and a vehicle extended line B (serving as a second assist line), on the image captured by the rear camera 13, i.e., on the screen of the monitor 10.

In the drawings, a reference code L (LC) is the target parking line and the reference code B (BC) is a vehicle extended line, The target parking line L is arranged in the target parking space F to be in parallel to a front-rear direction of the target parking space F. The target parking line L is displayed on the monitor 10 in a light-blue color, for example. According to the embodiment of the present invention, a central line, which is arranged or lined, at a central portion of the target parking space F to be in parallel to the front-rear direction of the target parking space F, is assigned to be the target parking line LC (serving as an assist line). On the other hand, the vehicle extended line B extends to a backward area of the vehicle 1 to be in parallel to the front-rear direction of the vehicle 1. The target parking line L (the first assist line) and the vehicle extended line B (the second assist line) are possibly overlapped each other on the image captured by the rear camera 13 when a vehicle reverse movement with the turning movement is completed. The vehicle extended line B is displayed on the monitor 10 in a blue color, for example. According to the embodiment of the present invention, a central extended line, which extends from a central portion of a lateral width of the vehicle 1 to the backward area of the vehicle 1 to be in parallel to the front-rear direction of the vehicle 1, is assigned as the vehicle extended line BC. Additionally, the front-rear direction of the target parking space F corresponds to the front-rear direction of the vehicle 1 when the vehicle 1 is parked in the target parking space F.

The target parking line L (LC) and the vehicle extended line B (BC) is displayed on the monitor 10 in a manner where a line width of one of the target parking line L (LC) and the vehicle extended line B (BC) is wider than a line width of the other. According to the embodiment of the present invention, the line width of the target parking line L (LC) is displayed to be larger than the line width of the vehicle extended line 1 (BC) on the monitor 10. As described above, the target parking line L (LC) and the vehicle extended line B (BC) respectively serve as the assist lines which overlap one another when the vehicle 1 completes a desired turning movement for parking the vehicle 1 to the parking frame E. The line width of one of the lines is displayed to be larger than the line width of the other line, thereby the operator can readily visually recognize that the two assist lines overlap one another (see FIG. 10).

The operation of the steering wheel 4 at the turning movement starting position P2 is detected by the steering sensor 14, and a detected result, which is detected by the steering sensor 14, is transmitted to the guiding portion 29. The guiding portion 29 calculates an expected course of the vehicle 1 on the basis of the detected result transmitted from the steering sensor 14. Then, the guiding portion 29 calculates a display position of the parking guides described above on the basis of the expected course of the vehicle 1, and displays the parking guides on the monitor 10 via the superimposing portion 25. As illustrated in FIG. 9, each of a left rear-end expected locus line referenced by Y1, a right rear-end expected locus line referenced by Y2, the 3 meters backward expected line Y3, the 1 meter backward estimated line Y4 and the 50 centimeters backward warning line R is drawn indicating a turning movement in the right direction of the vehicle 1.

The guiding portion 29 superimposes and displays the parking guides illustrated in FIG. 9 on the monitor 10 via the superimposing portion 25 and acoustically informs of the driving operation via the speaker 11. In other words, the guiding portion 29 guides the operator to reverse the vehicle 1 with the turning movement by maintaining a substantially maximum steering angle of the steering wheel 4 (the predetermined steering angle) until the target parking line LC and the vehicle extended line BC are overlapped one another. The operator maintains the steering wheel 4 at the substantially maximum steering angle and then, releases the brake pedal 8, thereby the vehicle 1 is slowly reversed by turning, for example by the creeping motion, in which a vehicle (with an automatic transmission, for example) moves without pressing on an accelerator pedal.

Figure 10:
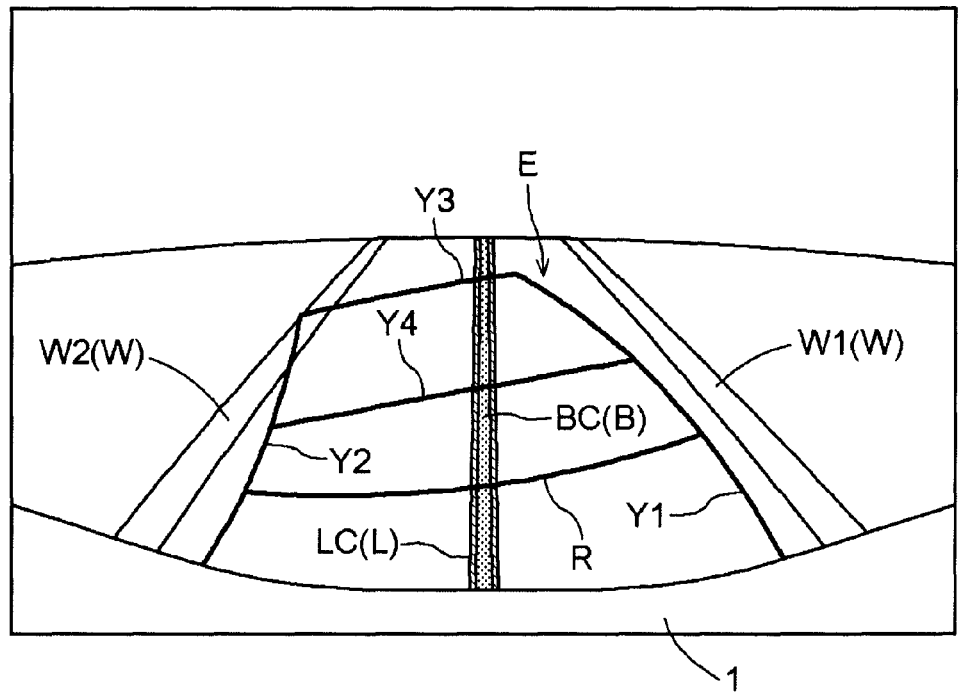
FIG. 10 is an explanatory view illustrating an example of the monitor screen when the vehicle is located at a turning movement completed position according to the embodiment.

As described above, the target parking line LC and the vehicle extended line BC are the assist lines which can overlap one another when the vehicle 1 completes the desired turning movement. Here, a time when the vehicle 1 completes the desired turning movement corresponds to a time when the vehicle 1 reaches the turning movement completed position P3 (see FIG. 5). FIG. 10 is an explanatory view illustrating an example of the screen of the monitor 10 when the vehicle 1 (reference point Q) is located at the turning movement completed position P3. As described above, according to the embodiment of the present invention, the line width of the target parking line LC is displayed to be larger than the line width of the vehicle extended line BC. Therefore, the operator can readily visually recognize that the two assist lines overlap one another. In addition, the two assist lines are displayed at a central portion of the screen of the monitor 10 and therefore, the two lines are well visible. In other words, the two assist lines are displayed at the central position, of the screen of the monitor 10, where a strain on the captured image may be less generated, and therefore, the operator can visually recognize an overlap of the two assist lines properly. After the operator recognizes the overlap of the two assist lines, the operator operates the brake pedal 8 and stops the vehicle 1.

When the vehicle 1 reverses with the turning movement, a condition of the steering wheel 4 is detected by the steering sensor 14 and the moving distance of the vehicle 1 is detected by the rotation sensor 18. The moving condition detecting portion 27 detects the moving condition of the vehicle 1 on the basis of results respectively detected by the steering sensor 14 and the rotation sensor 18. Then, the guiding portion 29 calculates coordinates of the reference point Q moving from the coordinates of the turning movement starting position P2, on the basis of a result detected by the moving condition detecting portion 27. Then, the guiding portion 29 calculates display positions for displaying the parking guides on the screen of the monitor 10 in response to a position of the reference point Q, and displays the parking guides on the monitor 1 via the superimposing portion 25.

Until the vehicle 1 reaches the turning movement completed position P3, the steering wheel 4 is maintained at the substantially maximum steering angle. Because of the steering angle of the steering wheel 4, each of the left rear-end expected locus line Y1, the right rear-end expected locus line Y2, the 3 meters backward expected line Y3, the 1 meter backward estimated line Y4 and the 50 centimeters backward warning line R is drawn to indicate the turning movement in the right direction of the vehicle 1. When the vehicle 1 approaches the turning movement completed position P3, a guiding line indicating the turning movement in the right direction of the vehicle (i.e., the right-rear end expected locus line Y2) overlaps a parking frame next to the parking frame E, as illustrated in FIG. 10. When the target parking line LC and the vehicle extended line BS are not displayed on the screen of the monitor 10, there is a possibility that the operator terminates to reverse the vehicle 1 by turning before the vehicle 1 reaches the turning movement completed position P3. That is because a sensory illusion, in which the operator feels that the vehicle is turned excessively, is generated by the parking guides informing of the turning movement in the right direction of the vehicle 1. However, by displaying the two assist lines, of which visibility is superior than the visibility of the parking guides indicating the turning movement of the vehicle 1 in the right direction, the sensory illusion felt by the operator is controlled and a reverse of the vehicle 1 can be guided as the predetermined steering angle of the steering wheel 4 is maintained until the vehicle 1 (reference point Q) reaches the turning movement completed position P3.

When the vehicle 1 is stopped after reaching the turning movement completed position P3, the guiding portion 29 acoustically informs of a next driving operation via the speaker 11, In other words, the guiding portion 29 guides the operator to return the steering wheel 4 to the neutral position and to reverse the vehicle 1 in a straight manner. Accordingly, the operator operates the steering wheel 4 and returns the steering angle of the steering wheel 4 to the neutral position. Then, the operator operates the brake pedal 8 and slowly reverses the vehicle 1 in a straight manner for example by the creeping motion. Next, the operator stops the vehicle at a desired position mainly relying on each of the 3 meters backward expected line Y3, the 1 meter backward estimated line Y4 and the 50 centimeters backward warning line R. The vehicle 1 (reference point Q) substantially reaches the target parking position P4 and is stopped there. At this moment, the target parking line L and the vehicle extended line B may be deleted, or may be displayed on the screen of the monitor 10.

According to a procedure described above, the vehicle 1 is properly guided to the target parking space F (parking frame E).

Figure 11:
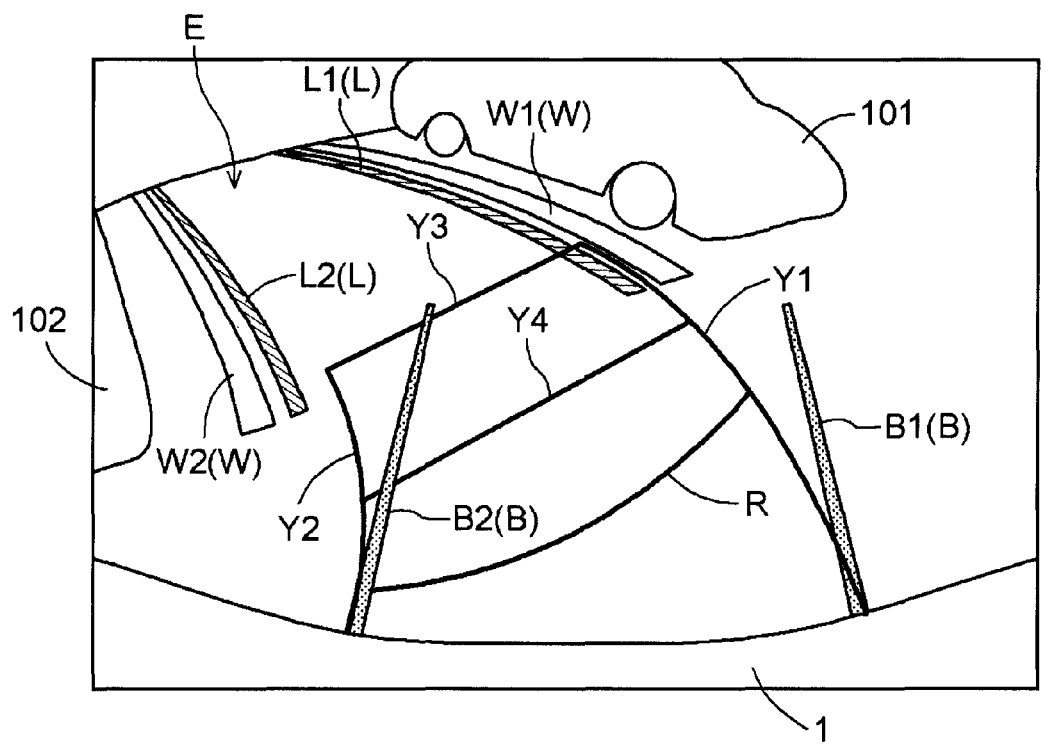
FIG. 11 is an explanatory view illustrating an example of the monitor screen when the vehicle is located at the tuning movement starting position according to a modified embodiment.
Figure 12:
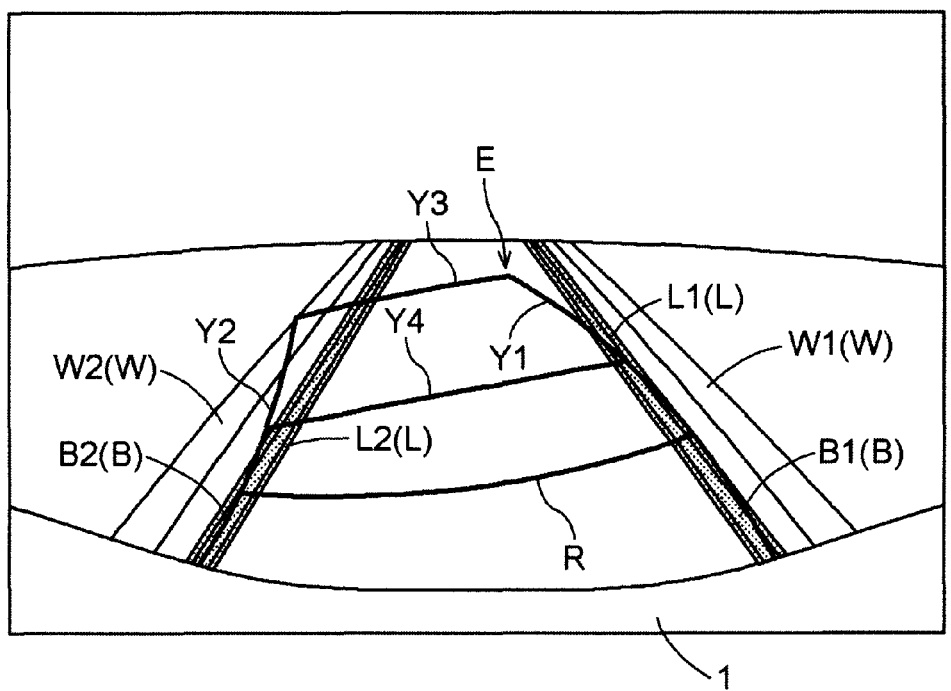
FIG. 12 is an explanatory view illustrating an example of the monitor screen when the vehicle is located at the turning movement completed position according to the modified embodiment.

According to the embodiment described above, the central line arranged to be in parallel with the front-rear direction of the target parking space F (parking frame E) is assigned as the target parking line L, and the extended line of the central line arranged to be in parallel with the front-rear direction of the vehicle 1 is assigned as the vehicle extended line B. However, the target parking line L and the vehicle extended line B are not limited as described above. Alternatively, the two lines can be modified as will be described herein in a modified embodiment. FIGS. 11 and 12 are explanatory views illustrating other examples of the screen of the monitor 10, other examples corresponding to the examples of the screen of the monitor 10 illustrated in FIGS. 9 and 10. According to the modified embodiment, the target parking line L includes at least two target parking lines L1, L2, provided to be away from one another in accordance with a width of the vehicle 1. In addition, the vehicle extended line B includes vehicle extended lines (second assist lines) B1, B2 respectively extending in the front-rear direction of the vehicle from lateral sides of the vehicle 1.

According to the modified embodiment, on the contrary to a case where the assist lines are respectively a central line of the parking frame E and a central line of the body width of the vehicle 1, two kinds of the assist lines are displayed on the screen of the monitor 10 slightly away from the central portion of the screen of the monitor 10. However, whether or not the desired turning movement is completed can be properly assured by visually recognizing that the extended lines B overlap the target parking lines L, respectively. Additionally, more than three of the target parking line L and the vehicle extended line B may be drawn.

The vehicle extended line B is the assist line which is parallel to the front-rear direction of the vehicle 1. Therefore, the vehicle extended line B is always drawn at a same position on the screen of the monitor 10, as illustrated in FIGS. 9 to 12. On the other band, a display position of the target parking line L on the screen of the monitor 10 is changed in accordance with the turning movement of the vehicle 1. In a case where the target parking line L is the central line of the target parking space F and when the vehicle extended line B and the target parking line L overlap one another, the target parking line L is displayed at the substantially central position of the screen of the monitor 10. It is comparably easy to visually recognize that the target parking line L, of which display position on the screen of the monitor 10 changes in accordance with the turning movement of the vehicle 1, reaches the substantially central position of the screen of the monitor 10. Accordingly, only the target parking line L (LC), which is the central line arranged to be in parallel with the front-rear direction of the target parking space F, may be superimposed on the captured image as the assist line. Accordingly, the superimposing portion 25 superimposes the target parking line LC, which is the central line arranged at a central portion of the target parking space F to be in parallel to the front-rear direction of the target parking space F, on the image captured by the image capturing portion 13 as the assist line.

Figure 13:
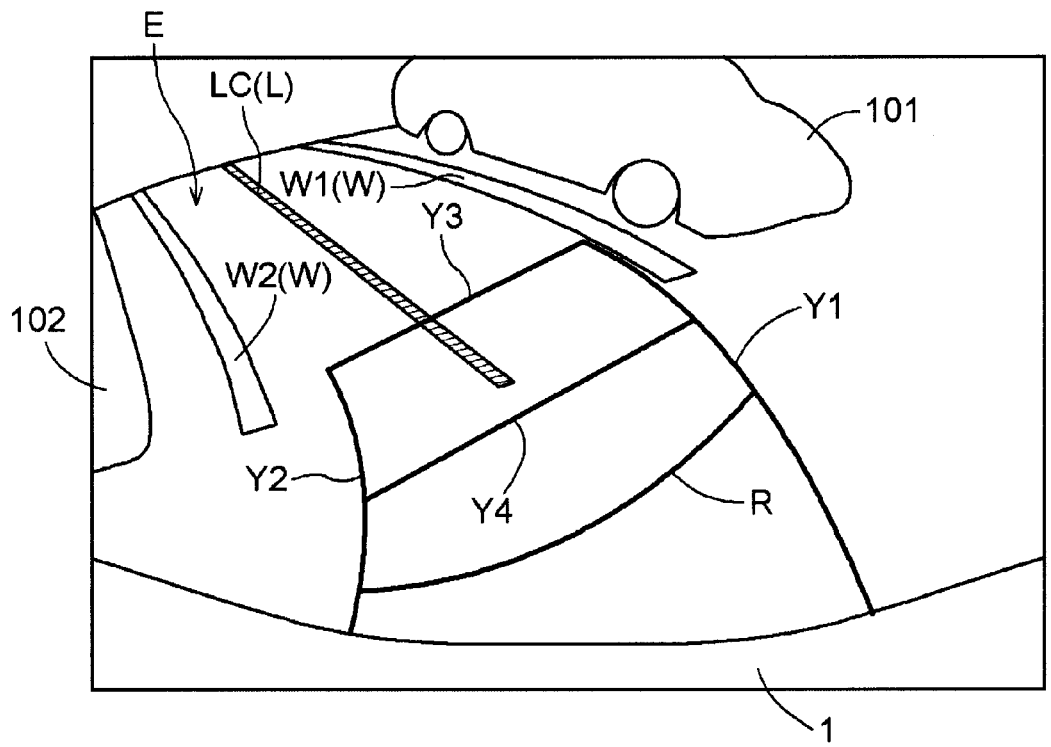
FIG. 13 is an explanatory view illustrating an example of the monitor screen on which a target parking line is displayed as an assist line when the vehicle is located at the turning movement starting position.
Figure 14:
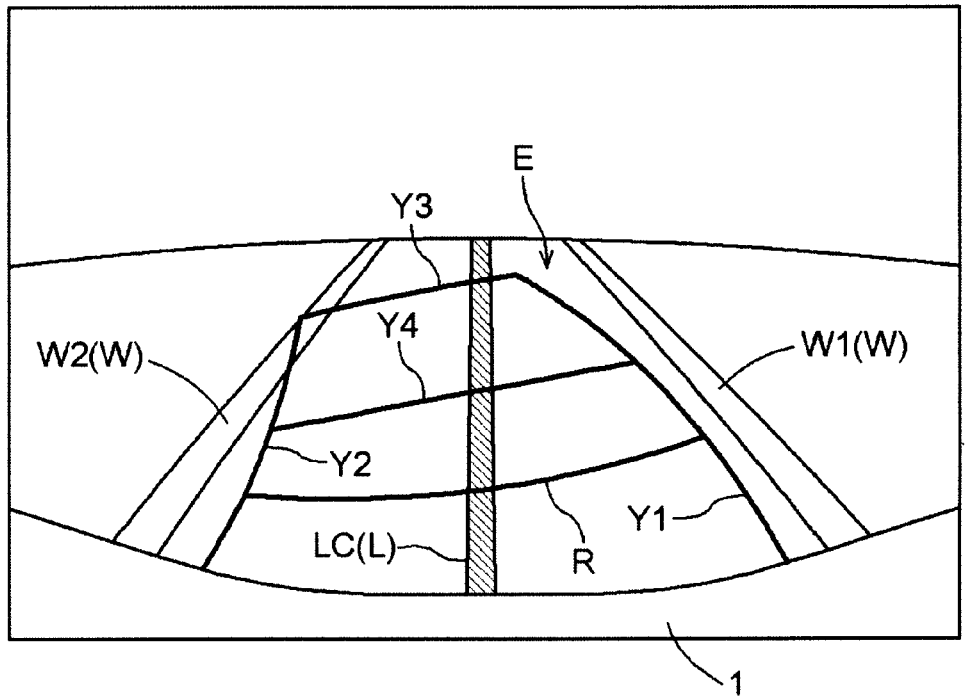
FIG. 14 is an explanatory view illustrating an example of the monitor screen on which the target parking line is displayed as the assist line when the vehicle is located at the turning movement completed position.

FIGS. 13 and 14 are explanatory views respectively illustrating examples where only target parking line LC from among the two assist lines is superimposed on the image captured on the screen of the monitor 10. FIG. 13 is the explanatory view of the screen of the monitor 10 when the vehicle 1 (reference point Q) is located at the turning movement starting position P2. FIG. 14 is the explanatory view of the screen of the monitor 10 when the vehicle 1 (reference point Q) is located at the turning movement completed position P3. When the vehicle is located at the turning movement starting position P2 where the desired turning movement is not completed, the vehicle 1 and the target parking space F (parking frame E) are not arranged to be parallel to one another. Therefore, the target parking line LC is drawn obliquely relative to the screen as illustrated in FIG. 13. On the other hand, when the vehicle 1 (reference point Q) is located at the turning movement completed position P3 where the desired turning movement is completed, the vehicle 1 and the target parking space F (parking frame E) are arranged to be in parallel. Accordingly, as illustrated in FIG. 14, the target parking line LC is drawn at the central portion of the screen to be perpendicularly relative to the screen Consequently, the operator can preferably visually recognize that the desired turning movement for the vehicle 1 is completed.

As described above, according to the present invention, display on the screen is more visible and therefore, a parking assist apparatus, with which the driving operation of the operator is properly assisted when parking, may be provided.

Due to the above described structure, the first and second assist lines (target parking line L and the vehicle extended line B), which can be overlapped one another when the vehicle 1 completes the reversing movement with the desired turning movement, are superimposed on the image captured by the rear camera 13. According to a known parking assist apparatus, a predetermined parking frame captured as an image and vehicle width extended lines, which respectively extend from lateral width of the vehicle, are arranged to be parallel with each other. Accordingly, the vehicle width extended lines and the predetermined parking frame may not overlap one another and it may be difficult to arrange the vehicle width extended lines and the parking target frame to be in parallel. Then, when the operator of the vehicle gazes on the predetermined parking frame, a next parking frame and a rear-end expected line extending to other parked vehicle may come into view of the operator beyond the parking frame to which the operator is about to park the vehicle. Therefore, the operator may stop holding a predetermined steering angle. However, according to the above described structure, the target parking line L and the vehicle extended line B, which are superimposed on the captured image, are overlapped one another when the desired turning movement is completed. Therefore, the operator of the vehicle may surely complete the vehicle reverse movement with the turning movement. Thus, the display on the screen is more visible and therefore, the driving operation of the operator is properly assisted when parking the vehicle.

Further, according to the aspect of the present invention, the parking assist apparatus assisting a parking operation of a vehicle 1 includes the rear camera 13 for capturing the image of the backward view of the vehicle 1, the monitor 10 for displaying the image captured by the image captured by the rear camera 13 at the inside of the vehicle 1, the guiding portion 29 for guiding the vehicle 1 to a target parking space F when the vehicle 1 reverses with at least the turning movement based on the predetermined steering angle held by the operator of the vehicle 1, and the superimposing portion 25 for superimposing the target parking line LC on the image captured by the rear camera 13. The target parking line LC is the central line arranged at the central portion of the target parking space F to be in parallel to the front-rear direction of the target parking space F.

Due to the above described structure, the target parking line LC, which is the central line arranged to be in parallel with the front-rear direction of the target parking space F, is superimposed on the image captured by the rear camera 13. According to the known parking assist apparatus, the predetermined parking frame captured as the image and the vehicle width extended lines, which respectively extend from the lateral width of the vehicle, are arranged to be parallel with each other. The predetermined parking frame is arranged at outside of the vehicle width extended lines and accordingly, it may be difficult to arrange the vehicle width extended lines and the parking target frame to be in parallel. In other words, the operator of the vehicle may be required to pay attention not only to the vehicle width extended lines but also to the predetermined parking frame positioned at the outside of the vehicle width extended lines. Accordingly, for example when the operator gazes on the predetermined parking frame, the next parking frame and the rear-end expected line extending to other parked vehicle may come into the view of the operator beyond the parking frame to which the operator is about to park the vehicle. Therefore, the operator may stop holding the predetermined steering angle. However, according to the above described structure, the target parking line LC, which is the central line arranged to be in parallel with the front-rear direction of the target parking space F, is superimposed on the image captured by the rear camera 13. When the target parking line LC extends in a straight manner on the captured image, the operator may be readily recognize whether or not the vehicle is positioned in the parking frame E. In addition, even when the vehicle extended lines (vehicle width extended lines) B1 and B2 are further superimposed on the captured image in the same manner as the known parking assist apparatus, the target parking line LC is arranged at inside of the vehicle extended lines B1 and B2 and therefore, a positional relationship between the target parking line LC and the vehicle extended lines B1 and B2 may be readily adjusted. Accordingly, the operator of the vehicle may surely complete the vehicle reverse movement with the turning movement. As described above, due to the above described structure, the display on the screen is more visible and therefore, the driving operation of the operator is properly assisted when parking the vehicle.

Still further according to the aspect of the present invention, the target paring line L includes at least two target parking lines L1, L2 provided to be away from one another in accordance with the width of the vehicle 1, and the vehicle extended line B includes the vehicle extended lines B1, B2 respectively extending in the front-rear direction of the vehicle a from lateral sides of the vehicle 1. When the desired turning movement is completed, the target parking lines L1, L2 and the vehicle extended lines B1, B2 are respectively overlapped on the captured image.

Due to the above described structure, the target parking lines L1 and L2 are provided to be away from one another, and the vehicle extended lines B1 and B2 are provided to be away from one another. Accordingly, the target parking lines L1, L2 and the vehicle extended lines B1, B2 may be appropriately overlapped, respectively, on the image captured by the rear camera 13 and displayed on the screen of the monitor 10.

Still further according to the aspect of the present invention, the target parking line L is the target parking line LC, which is arranged at the central portion of the target parking space F to be in parallel to the front-rear direction of the target parking space F, and the vehicle extended line B is the vehicle extended line BC, which extends from the central portion of the lateral width of the vehicle 1 to the backward area of the vehicle 1 to be in parallel to the front-rear direction of the vehicle 1. When the desired turning movement is completed, the target parking line LC and the vehicle extended line BC are overlapped one another.

Due to the above described structure, only one target parking line L (LC) and only one vehicle extended line B (BC) are superimposed on the captured image as the assist lines and each of the target parking line LC and the vehicle extended line BC is the central line. Accordingly, when the target parking line LC and the vehicle extended line BC are displayed on the screen of the monitor 10, the operator of the vehicle 1 may visually recognize change of the display position of the target parking line LC on substantially central position of the screen of the monitor 10. Accordingly, the target parking line LC and the vehicle extended line BC are properly overlapped one another.

Still further according to the aspect of the present invention, the guiding portion 29 guides the vehicle 1 to reverse in the straight manner until the vehicle 1 reaches the turning movement starting position P2, and guides the operator to hold the predetermined steering angle at the turning movement starting position P2. Then, the guiding portion 29 guides the vehicle 1 to reverse with the turning movement based on the predetermined steering angle held by the operator of the vehicle 1 until the vehicle 1 reaches the turning movement completed position P3 and then guides the vehicle 1 to reverse in the straight manner until the vehicle 1 is accommodated in the target parking space F. Further, the superimposing portion 25 superimposes the mark C which makes a contact with the parking frame E including the target parking space F and thereby indicating the turning movement starting position P2, i.e., the position to terminate the vehicle reverse movement with the turning movement, on the screen of the monitor 10.

Due to the above described structure, the turning movement starting position P2 is displayed on the screen of the monitor 10. From the turning movement starting position P2, the vehicle 1 is parked at the target parking area F in a case where the vehicle reverse movement with the turning movement is started at the predetermined steering angle. Accordingly, the operator of the vehicle 1 may properly reverse the vehicle 1 in the straight manner to the turning movement starting position P2, and then, the operator of the vehicle 1 sets, or holds, the steering angle to the predetermined steering angle. Therefore, the target parking line LC, which is superimposed by the superimposing portion 25 after the vehicle 1 reaches to the turning movement starting position P2, may be superimposed at an appropriate portion on the captured image and displayed on the screen of the monitor 10. Accordingly, the operator of the vehicle 1 may properly reverse the vehicle 1 in accordance with the target parking line L until the vehicle 1 reaches to the turning movement completed position P3. Consequently, the operator of the vehicle 1 may properly park the vehicle 1 in the parking frame E.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assist apparatus assisting a parking operation of a vehicle, comprising:
an image capturing portion capturing an image of a backward view of the vehicle;
a displaying portion displaying the image captured by the image capturing portion at an inside of the vehicle;
a guiding portion guiding the vehicle to a target parking space when the vehicle reverses with at least a turning movement based on a predetermined steering angle held by an operator of the vehicle; and
a superimposing portion superimposing a first assist line arranged in the target parking space to be in parallel to a front-rear direction of the target parking space and a second assist line extending to a backward area of the vehicle to be in parallel to a front-rear direction of the vehicle on the image captured by the image capturing portion, the first assist line and the second assist line both being overlapped with respect to each other when a vehicle reverse movement with the turning movement is completed and before a reverse movement in a straight manner into the target parking space;
wherein the first assist line is displayed so as to be static with respect to the target parking space on the screen in accordance with the turning movement of the vehicle, and the second assist line is displayed so as to be static on the screen during the turning movement of the vehicle.

2. A parking assist apparatus according to claim 1, wherein the front-rear direction of the target parking space corresponds to the front-rear direction of the vehicle when the vehicle is parked in the target parking space.

3. A parking assist apparatus according to claim 1, wherein the first assist line includes at least two first assist lines provided to be away from one another in accordance with a width of the vehicle, and the second assist line includes second assist lines respectively extending in the front-rear direction of the vehicle from lateral sides of the vehicle.

4. A parking assist apparatus according to claim 1, wherein the first assist line is arranged at a central portion of the target parking space to be in parallel to the front-rear direction of the target parking space, and the second assist line extends from a central portion of a lateral width of the vehicle to the backward area of the vehicle to be in parallel to the front-rear direction of the vehicle.

5. A parking assist apparatus according to claim 1, wherein the guiding portion guides the vehicle to reverse in a straight manner until the vehicle reaches a position to start the turning movement and guides the operator to hold the predetermined steering angle at the position to start the turning movement, then the guiding portion guides the vehicle to reverse with the turning movement based on the predetermined steering angle held by the operator of the vehicle until the vehicle reaches a position to complete the turning movement and then guides the vehicle to reverse in the straight manner until the vehicle is accommodated in the target parking space, and wherein the superimposing portion superimposes a mark making a contact with a parking frame including the target parking space and thereby indicating the position to start the turning movement on the displaying portion.

* * * * *